United States Patent [19]

Siefken

[11] 4,020,043

[45] Apr. 26, 1977

[54] VULCANIZABLE ALKOXYSILYL CAPPED POLYMER COMPOSITION

[75] Inventor: Mark W. Siefken, Woodbury, Minn.

[73] Assignee: Minnesota Mining and Manufacturing Company, St. Paul, Minn.

[22] Filed: Mar. 7, 1975

[21] Appl. No.: 556,495

[52] U.S. Cl. .................. 260/46.5 G; 260/46.5 R; 260/77.5 AM; 260/824 R; 260/827; 526/3; 526/279

[51] Int. Cl.² ....................................... C08G 77/04

[58] Field of Search ........ 260/80 PS, 80.71, 824 R, 260/827, 77.5 AM, 46.5 G, 46.5 R; 526/3, 279

[56] References Cited

UNITED STATES PATENTS

| | | | |
|---|---|---|---|
| 3,476,826 | 11/1969 | Millen | 260/46.5 G |
| 3,480,584 | 11/1969 | Archer et al. | 260/86.1 R |
| 3,499,859 | 3/1970 | Matherly | 260/46.5 G |
| 3,560,244 | 2/1971 | Neuroth | 260/46.5 G |
| 3,627,722 | 12/1971 | Seiter | 260/46.5 G |
| 3,632,557 | 1/1972 | Brode et al. | 260/77.5 TB |
| 3,681,010 | 7/1972 | Brode | 260/46.5 G |
| 3,755,252 | 8/1973 | Buning et al. | 260/80.71 |
| 3,776,977 | 12/1973 | Chadha | 260/46.5 G |
| 3,870,766 | 3/1975 | Chadha | 260/827 |

*Primary Examiner*—Melvyn I. Marquis
*Attorney, Agent, or Firm*—Cruzan Alexander; Donald M. Sell; Richard Francis

[57] ABSTRACT

A room temperature moisture curable composition contains a vulcanizable polymer having at least one terminal trialkoxysilyl group and a catalytic amount of a fluoroaliphaticsulfonyl-substituted ethylene compound.

6 Claims, No Drawings

VULCANIZABLE ALKOXYSILYL CAPPED POLYMER COMPOSITION

BACKGROUND OF THE INVENTION

The invention relates to one-part viscous compositions which vulcanize or crosslink at room temperature in the presence of moisture to form cured rubbery or hard products. More particularly, the invention relates to vulcanizable polymers having a terminal trialkoxysilyl group.

Resin compositions comprising vulcanizable polymers having terminal alkoxysilyl groups are known. Early in their development the compositions were marketed as two part systems, one part containing a vulcanizable polymer and the other containing a crosslinking agent. U.S. Pat. No. 3,127,363 shows an example of such a two part composition.

More recently, one part room temperature vulcanizable compositions have been disclosed. Examples of such one part compositions can be seen in U.S. Pat. Nos. 3,035,016, 3,480,584 and 3,661,816. While the one part vulcanizable compositions are desired, since they eliminate the difficulties encountered in on-site mixing of the polymer with the crosslinking agent, they have been heretofore limited to use situations which allow prolonged periods of time for cure. Such a limitation has been dictated by present prior art crosslinking agents. These agents of necessity must be latent; i.e., they must be capable of being mixed with the vulcanizable polymers without causing appreciable crosslinking, yet must be capable of promoting crosslinking on exposure to the crosslinking conditions. Exposure to ambient atmosphere is the preferred crosslinking condition, thus most of the crosslinking agents are activated by atmospheric moisture.

Prior to the present invention, one part vulcanizable compositions have required as long as eighteen hours or longer to cure under ambient conditions. The compositions of the prior art, generally, do not provide a cure at room temperature in less than three hours.

SUMMARY OF THE PRESENT INVENTION

The present invention provides a one part room temperature vulcanizable composition which will rapidly cure upon exposure to atmospheric moisture. Curing is usually accomplished in about 5 minutes or less. Additionally, the composition of the invention can be modified, by the proper selection of ingredients, to provide any desired cure time, as short as 1 minute or shorter to several hours or more.

The composition of the invention comprises a vulcanizable polymer having at least one terminal trialkoxysilyl group in admixture with a catalytic amount of a fluoroaliphaticsulfonyl-substituted ethylene compound.

Fluoroaliphaticsulfonyl-substituted ethylene compounds useful as crosslinking agents for curing vulcanizable alkoxysilyl end capped polymers have the formula

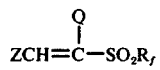

wherein $R_f$ is a monovalent saturated fluoroaliphatic group, for example, containing from 1 to 18 carbon atoms (preferably 1 to 8 carbon atoms) with the majority of carbon atoms preferably being perfluorinated; Q is a monovalent, nonionic, electron withdrawing group that is at least as electron withdrawing as a benzoyl radical [i.e., having a Hammett Sigma (para) value of at least 0.5], e.g., a cyano, arylcarbonyl, alkylcarbonyl, perfluoroalkylcarbonyl, arylsulfonyl, perfluoroalkylsulfonyl, nitro, fluorosulfonyl, or chlorosulfonyl group, (preferably Q has the general formula $R_f' SO_2$ wherein $R_f'$ is a fluoroaliphatic group as defined for $R_f$ above, including $R_f'$ being the identical to $R_f$); and Z is an aromatic group including an aryl, an arylmethyl group each having 1–3 benzene rings, an unsaturated, conjugated heterocyclic organic radical containing one or more oxygen, sulfur, or nitrogen heteroatoms and having a valence on a carbon atom (e.g.,

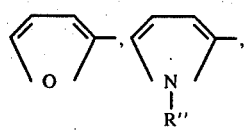

wherein R' is H or a lower alkyl,

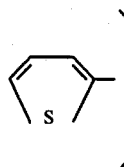

each of which may have one or more substituents such as a chlorine, bromine, fluorine atom, an alkyl, alkoxy, dialkylamino, or nitro group.

The above-mentioned fluoroaliphatic groups can contain chlorine atoms bonded to the carbon atoms as well as having fluorine and hydrogen atoms bonded to carbon atom. Preferably, for any two carbons bonded together in a chain, there is no more than one hydrogen atom or one chlorine atom with fluorine atoms occupying the remaining non-skeletal carbon bonds.

The fluoroaliphatic radical may be a straight or branched chain, or a straight chain including a cyclic portion. Additionally, the fluoroaliphatic group may contain an oxygen atom linking two carbon atoms, e.g., —$CF_2OCF_2$—, or a nitrogen atom linking three carbon atoms, e.g., $(R_fCF_2)_2NCF$—. Exemplary fluoroaliphatic groups include perfluoromethyl, perfluorobutyl, perfluorooctyl, perfluorododecyl, perfluoroisopropyl, perfluoro-(2-cyclohexylethyl), omega-chloroperfluorohexyl, 2-hydroperfluoropropyl, perfluoroethoxyperfluoroethyl, perfluorobutoxyperfluoropropyl, perfluoro(3-morpholinopropyl), and perfluoro(3-piperidinopropyl).

The combined electron withdrawing nature of the $SO_2R_f$ group and the Q group is influential in providing the desired catalytic activity; the greater the electron withdrawing nature, the greater the catalytic activity will be of the fluoroaliphaticsulfonyl-substituted ethylene compounds. The electron withdrawing nature of the $SO_2R_f$ and Q groups can be determined by various known methods, e.g., by Hammett sigma (para) values as obtained by the method disclosed by H. H. Jaffe, Chem. Rev. 53 191 (1953). For the purpose of providing useful catalytic activity the combined electron withdrawing nature of the $SO_2R_f$ and Q groups should provide a sigma (para) value of at least 1.0, with the Q group having a sigma (para) value of at least 0.5. Preferably, the $SO_2R_f$ group has a sigma (para) value of at least 0.7 providing a combined sigma (para) value of at least 1.2 for the two groups. A benzoyl group, for example, has a sigma (para) value of 0.5. A preferred $SO_2R_f$ group is $SO_2CF_3$ having a sigma (para) value of 0.9. A very useful fluoroaliphaticsulfonyl-substituted ethylene is provided when both Q and $SO_2R_f$ are $SO_2CF_3$ groups. Additionally, exemplary organic groups providing useful Q groups include cyano, arylcarbonyl, alkylcarbonyl, perfluoroalkylcarbonyl, perfluoroalkylsulfonyl, nitro, fluorosulfonyl, and chlorosulfonyl groups.

The fluoroaliphaticsulfonyl-substituted ethylenes are prepared by condensation of precursor fluoroaliphaticsulfonyl methanes with aldehydes as described in assignee's copending application by Robert J. Koshar, Serial No. 300,754, filed October 25, 1972 now Pat. No. 3,932,526 and incorporated herein by reference.

The vulcanizable polymers that are crosslinked by the fluoroaliphaticsulfonyl-substituted ethylene crosslinking agents are characterized by having at least one terminal trialkoxysilyl group of the formula $-Si(OR)_3$ wherein R is a monovalent lower alkyl group having 1–6 carbon atoms, for example, methyl, ethyl, propyl, etc. Suitable vulcanizable polymers are the silicone terminated polyurethanes described in U.S. Patent No. 3,632,557 incorporated herein by reference.

Preferably the vulcanizable trialkoxysilyl capped polymer is (A) or (B) as follows:

(A) A polymer having the formula $$R_1[O-CO-NH-R_2-NH-CO-X-R_3-Si(OR)_3]_n$$

wherein $R_1$ is a polyvalent radical which is the residue resulting from the removal of n hydroxyl groups from a polyhydroxy compound having a molecular weight of from 200 to 6000, n is an integer of from 1 to 6. $R_2$ is a divalent alkylene group having from 1 to 18 carbon atoms or a divalent aromatic radical having from 6 to 18 carbon atoms and is the alkyl or aromatic portion of a diisocyanate compound on removal of the isocyanate groups $R_2$, for example, can be aliphatic, cycloaliphatic, araliphatic or aromatic. X is a divalent bridging group selected from $-O-$, $-S-$, and $-NR_4-$ wherein $R_4$ is hydrogen or a lower alkyl group having from 1 to 6 carbon atoms. $R_3$ is a divalent hydrocarbon radical or a divalent hydrocarbon ether radical having from 1 to 18 carbon atoms.

B. A copolymer formed of 100 moles of a polymerizable organic vinylic compound and 0.01 to 100 moles (preferably 0.1 to 25 moles) of an organic vinylic compound having a terminal trialkoxysilyl radical and a general formula

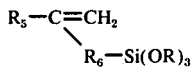

wherein $R_5$ is hydrogen, chlorine, or methyl, and $R_6$ is a divalent radical selected from

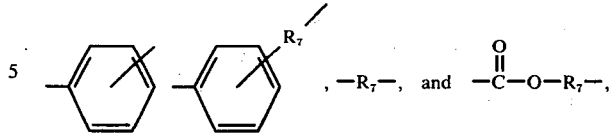

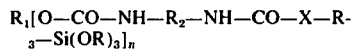

wherein $R_7$ is a divalent lower alkylene group having 2–6 carbon atoms.

The vulcanizable polymers represented by Formula A can conveniently be prepared by the chemical reaction of an organosilane with isocyanate capped polyhydroxy compound. The method is described in detail in U.S. Pat. No. 3,632,557.

The organosilanes have a reactive hydrogen atom capable of reacting with the isocyanate groups of the isocyanate capped prepolymer to provide a chemically stable viscous material. Exemplary organosilanes include γ-aminopropyltriethoxysilane, p-aminophenyltrimethoxysilane, γ-hydroxypropyltrimethoxysilane, and γ-mercaptopropyltrimethoxysilane. Other useful silanes are disclosed in aforementioned U.S. Pat. No. 3,632,557.

The isocyanate capped polyhydroxy compounds useful in the present invention to produce vulcanizable polymers represented by the formula defined as polymer "A" above are prepared by reacting a molar excess or organic diisocyanate with one or more polyhydroxy compounds utilizing methods which are well known in the art.

Particularly useful diisocyanates include 2,4- and 2,6-tolylene diisocyanate; 1,5-naphthylene diisocyanate; 4,4'-diisocyanato-phenylmethane; 3,3'dimethyl-4,4'-biphenylene diisocyanate; 4,4'biphenylene diisocyanate; and 3,3-dichloro-4,4-biphenylene diisocyanate.

Suitable polyhydroxy compounds have a molecular weight from about 200 to 6000, and include such compounds as alkylene oxide adducts of water, ethylene glycol, diethylene glycol, propylene glycol, dipropylene glycol, glycerol, 1,2,6-hexanetriol, 1,1,1-trimethylol ethane or propane pentaerythritol, sorbitol, sucrose, lactose, alpha-methylglucoside, alpha-hydroxyalkylglucoside, and the like. The alkylene oxides employed in producing polyoxyalkylene polyols normally have from 2 to 4 carbon atoms. Ethylene oxide, propylene oxide and mixtures of propylene oxide with ethylene oxide are preferred. Many of these polyoxyalkylene polyols are commercially available compounds under trade designations such as "Carbowax" and "Niax" available from Union Carbide Corp., "Thanol" available from Jefferson Chemical Company and "Pluronic" available from Wyandotte Chemical Company.

Other suitable polyhydroxy compounds include the polyester polyols and alkylene oxide adducts thereof, polyesters obtained by reaction of polycarboxylic acids, their anhydrides, esters, or halides with a stoichiometric excess of a polyol such as the polyesters of succinic acid, adipic acid or phthalic acid with a polyol such as ethylene glycol, diethylene glycol, propylene glycol, or glycerine; polytetramethylene glycols, such as polytetrahydrofuran; lactone polyols such as polyols prepared by the reaction of a lactone such as ε-caprolactone with a polyol; and functional glycerides such as castor oil and alkylene oxide adducts of castor oil.

The copolymers defined in paragraph B shown above are known compounds produced by the copolymerization of at least one vinylic monomer with an organo trialkoxysilyl terminated compound having olefinic unsaturation. A description of these polymers and the method of their preparation can be found in U.S. Pat. No. 3,480,584 and in an article by Lewis and Lewis, J. of Polymer Science 36, p 325–328(1958), the patent being incorporated herein by reference.

Useful trialkoxysilyl monomers include p-trimethoxysilylstyrene, p-trimethoxysilyl-α-methylstyrene, p-trimethoxysilylethylstyrene, p-[3-(tributoxysilyl)-propyl]styrene, p-[3-(triethoxysilyl)propyl]styrene, p-[4-(trimethoxysilyl)butyl]styrene, 0-[3-(trimethoxysilyl)propyl]styrene, m-[3-(trimethoxysilyl)propyl]styrene, p-[6-(trimethoxysilyl)hexyl]styrene, allyltrimethoxysilane, trimethoxysilylethyl acrylate, trimethoxysilylethyl methacrylate, trimethoxysilylethyl α-chloroacrylate, 3-(trimethoxysilyl)propyl acrylate, 3-(trimethoxysilyl)propyl methacrylate, 3-(triethoxysilyl)propyl methacrylate, 3-(tributoxysilyl)propyl methacrylate, and 2-(trimethoxysilyl)propyl methacrylate.

The vinylic trialkoxysilyl monomers may be prepared by any suitable method. A convenient method of synthesis comprises reacting a trialkoxysilane of the formula $HSi(OR)_3$ with a diolefin of the formula $$\begin{array}{c} R_5-C=CH_2 \\ | \\ R_8 \\ | \\ R_9-C=CHR_{10} \end{array}$$

wherein $R_5$ is defined above, $R_8$ is

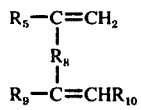 or $-\overset{\overset{\text{O}}{\|}}{\text{C}}-\text{O}-$, and $R_9$ and $R_{10}$ are each hydrogen or a lower alkyl group having 1–4 carbon atoms and $R_9$ and $R_{10}$ together have no more than 4 carbon atoms. This reaction is best performed in the presence of a platinum or platinum-containing catalyst employing conditions which are adjusted to promote addition of the $HSi(OR)_3$ to the unsaturated bond of the alkenyl group.

Particularly useful diolefin compounds suitable for use in the synthesis of the vinylic trialkoxysilyl monomers include o-, m-, and p-divinylbenzene, o-, m-, and p- allylstyrene, 3-butenylstyrene, butadiene, isoprene, chloroprene, vinyl acrylate, allyl acrylate, allyl methacrylate, 3-butenyl methacrylate, and 6-hexenyl methacrylate.

Vinylic monomers suitable for copolymerization with an organo trialkoxysilyl terminated compound to provide the copolymers of paragraph B are any of a variety of free radical polymerizable ethylenically unsaturated monomeric compounds. Such compounds are well known in the art and include as preferred examples for present purposes: styrene, alkyl acrylates, alkyl methacrylates, acrylonitrile, isoprene, chloroprene, butadiene, vinylalkyl ethers, vinylidene chloride and isobutylene. If desired, mixtures of such organic vinylic compounds may be employed and in some cases the use of mixtures to obtain certain desired properties in the end product may be preferred.

The room temperature vulcanizable compositions of the invention are prepared by mixing, in the absence of moisture, the vulcanizable polymer having at least one terminal trialkoxysilyl radical with from about 0.05% to 5% (preferably 0.1% to 1%) by weight of the fluoroaliphaticsulfonyl-substituted ethylene crosslinking catalyst. Generally, the use of less than 0.05% catalyst results in a composition that cures too slowly or not at all. The use of more than 5% catalyst is impractical since the curing rate is not increased with more than this amount of catalyst.

Because of the rapidity of curing of the vulcanizable compositions of the invention the catalyst must be mixed into the vulcanizable polymer in the exclusion of moisture. Generally this is done in closed equipment that has been flushed with a dry inert gas such as dry nitrogen. To avoid the formation of "hot" spots in the mixture, the catalyst is added slowly to the rapidly stirred vulcanizable polymer. For those instances in which the catalyst is a solid, it is advantageous to add the catalyst as a solution in an inert solvent such as methylene chloride, benzene or toluene. For some vulcanizable polymers, particularly those that are solid, it is generally advantageous to dilute the polymer with up to about 10 parts by weight or more of an inert solvent per each part by weight of polymer for the purpose of adjusting the viscosity of the mixture to a viscosity suitable for handling. The resulting mixtures are generally packaged in conventional vials, tins or squeeze tubes.

The vulcanizable compositions of this invention can be modified by incorporating therein any number of conventional fillers, e.g., reinforcing fillers such as finely divided silica, non-reinforcing fillers such as coarse silicas, diatomaceous earth, metallic oxide such as titania, ferric oxide, zinc oxide, talc and the like, and fibrous fillers such as asbestos or glass fibers or filaments. It is required that the filler be substantially dry and non reactive with the catalyst before admixing with the compositions of the invention. The fillers are added in proportions up to about 200 percent by weight of the curable composition, preferably up to about 50 percent.

The vulcanizable compositions of the invention may also contain modifiers such as resinous siloxane modifiers, plasticizers, pigments, UV stabilizers, oxidation inhibitors, and dielectric substances such as graphite or carbon black. Particularly desirable stabilizers are organic isocyanates, especially organic polyisocyanates such as toluene diisocyanate, poly(methylene-phenylene isocyanates), and polyisocyanates obtained by endcapping a polyoxyalkylene polyol with a polyisocyanate such as toluene diisocyanate. Such compounds stabilize the vulcanizable compositions of the invention against premature curing from impurities such as traces of water and excess silane which might be present in the composition. Generally 3 to 15% by weight and preferably about 10% by weight of stabilizer is sufficient for such purpose.

The vulcanizable compositions of the invention are useful in coating applications, in caulking, sealing, and adhesive applications, and as encapsulating or potting compounds. They can be applied to moist or wet surfaces and cured into cross-linked elastomers without deleterious effects. The cured products become tack-free within an extremely short period of time as herein-before mentioned. Additionally, the vulcanized compositions of the invention strongly adhere alone or with the aid of a primer to a wide variety of substrates such as glass, porcelain, wood, metals, polymeric materials and the like. These properties make the vulcanizable compositions of the invention extremely useful for caulking, adhesive or laminating applications.

The vulcanizable compositions, i.e., the alkoxysilyl-terminated polymers plus the aforementioned catalysts, will remain stable under anhydrous storage conditions for prolonged periods of time, even at temperatures up to 80° C or higher.

The following examples, wherein all parts and percents are by weight unless otherwise indicated, illustrate the invention.

EXAMPLE 1

To 349 g (0.23 equivalent) of polyoxypropylene glycol (molecular weight of 3000) which had been dried by azeotroping with benzene was added under nitrogen 41.7 g (0.24 mole) of toluene diisocyanate. The reactants were heated at 60°–80° C for a period of 20 hours, producing a syrupy NCO-endcapped polymer which was allowed to cool to room temperature. Then, 53 g (0.24 mole) of γ-aminopropyltriethoxysilane was added to the prepolymer with stirring which was continued over several hours at room temperature, producing a trialkoxysilyl-endcapped vulcanizable polymer believed to have the formula:

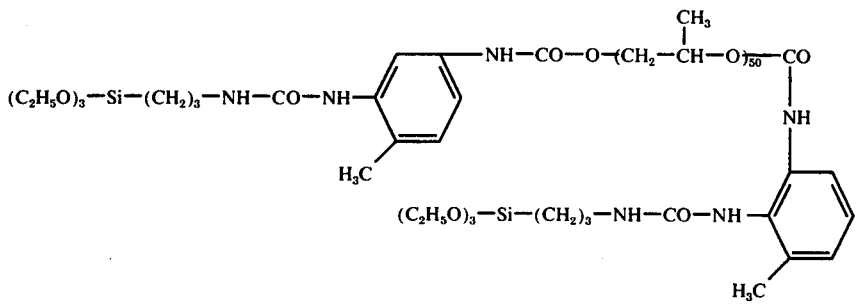

Infrared analysis of this polymer revealed the absence of the isocyanate group.

In a glove bag maintained under a positive pressure of dry nitrogen, 1 g of β-β-bis(perfluoromethylsulfonyl)styrene (prepared according to Example 2 of aforementioned U.S. Ser. No. 300,754 now U.S. Pat. No. 3,932,526) in 15 ml of methylene chloride was added to 100 g of the above-described trialkoxysilyl-endcapped vulcanizable polymer with vigorous stirring.

The resultant viscous mixture was placed in a closed container such as a can or a squeeze tube. On exposure to air at a relative humidity of about 30%, the surface of the mixture cured to a tack-free condition in 2 to 5 minutes. One-fourth inch thick samples of the viscous vulcanizable mixture cured to a tough rubbery product in 1 to 2 hours on exposure to air having a relative humidity of about 30%. Anhydrous samples of the mixture remained fluid for several weeks at room temperature.

When 3 to 15% by weight of an organic isocyanate, e.g., toluene diisocyanate-endcapped polyoxyethylenediol (MW = 1000), was added to the catalyzed triethoxysilyl-endcapped vulcanizable polymer composition as a stabilizer, the composition remained fluid for at least 12 weeks at 50° C, indicating by past experience with such mixtures a shelf stability of many months at room temperature. Samples of the same mixture, stored for 12 weeks at 50° C surface, cured tack-free in 2 to 5 minutes and cured to a tough rubber in 1 to 2 hours on exposure to air as did the freshly prepared mixtures.

EXAMPLES 2–7

The procedure of Example 1 was repeated using, in place of the 3000 molecular weight polyoxypropyleneglycol, an equivalent amount of the polyhydroxy compounds listed in Table 1. One percent of β,β-bis(perfluoromethylsulfonyl)styrene in methylene chloride was added to portions of each of the triethoxysilyl-endcapped polymers obtained to prepare room temperature vulcanizable compositions which were cured and evaluated. The Shore 00 hardness (after 2 hours in air having 30% relative humidity), tensile strength, and percent elongation at break of the vulcanized polymer are given in Table 1.

TABLE 1

| Example No. | Polyhydroxy Polyol | Hardness Shore 00 | Tensile Strength psi | % Elongation at Break |
|---|---|---|---|---|
| 2 | Polyoxypropyleneglycol (MW 2000) | 70 | 343 | 74 |
| 3 | Poly(ethyleneglycol-adipate) (MW 3200) | 70 | 531 | 195 |
| 4 | Polycaprolactone (MW 800) | 80 | 3700 | 72 |
| 5 | Poly(hexamethyleneglycolphthalate) (MW 416) | 90 | 600 | 37 |
| 6 | Castor Oil (MW 430) | 95 | — | — |
| 7 | Polytetrahydrofuran (MW 800) | 85 | 1395 | 20 |

EXAMPLE 8

A mixture of 71 g (0.71 mole) methyl methacrylate, 17.6 g (0.071 mole) 3-trimethoxysilyl)propyl methacrylate, 0.1 g of benzoyl peroxide, and 100 ml of benzene were heated at 80° C under an atmosphere of nitrogen for 3 hours. The solvent was stripped from the reaction mixture to give a white pasty solid which, after rinsing with methanol and hexane and drying under vacuum, gave a vulcanizable trialkoxysilyl copolymer as a white powder. The analysis of this product by nuclear magnetic resonance verified the anticipated copolymer structure. The powder was soluble in common organic solvents, i.e., methylene chloride, tetrahydrofuran and benzene, indicating that it was not cross-linked. A solution was prepared by dissolving 10 g of the powder in 90 ml of benzene and adding 10 ml of benzene containing 0.1 g of β,β-bis(trifluoromethylsulfonyl)styrene. Films cast from the solution and permitted to dry in air having a relative humidity of 30% were tough, clear and essentially colorless. Within several minutes after drying, the films were tack-free and no longer soluble in benzene and other common solvents, indicating that the composition cross-linked on exposure to air.

EXAMPLE 9

Example 8 was repeated using in place of methyl methacrylate an equivalent amount of ethyl acrylate, producing a gummy resin copolymer. A layer produced by coating a benzene solution containing 10% of the copolymer and 1% of β,β-bis(trifluoromethylsulfonyl)styrene cured to tough tack-free films which was insoluble in benzene within minutes after drying. A coating of 10% of this copolymer in benzene not containing β,β-bis(trifluoromethylsulfonyl)styrene was benzene soluble after about 12 hours.

EXAMPLE 10

Example 8 was repeated using (1) in place of methyl methacrylate an equivalent amount of styrene and (2) an equivalent amount of 2-(trimethoxysilyl)ethyl styrene in place of 3-(trimethoxysilyl)propyl methacrylate, producing a vulcanizable copolymer. A benzene solution was prepared containing 10% of the copolymer and 1% of β,β-(trifluoromethylsulfonyl)styrene. Films cast from this solution were tack-free and insoluble in benzene within minutes after the benzene has evaporated.

EXAMPLES 11–17

Example 8 was repeated using various amounts of 3-(trimethoxysilyl)propyl methacrylate as are shown in Table 2.

Table 2

| | A | B | | |
|---|---|---|---|---|
| Ex. No. | Methyl Methacrylate Grams | 3-(Trimethoxysilyl)-propyl Methacrylate Grams | Mole % B | Hardness Shore A2 |
| 11 | 71 | 1.1 | 0.6 | 93 |
| 12 | 71 | 2.2 | 1.25 | 90 |
| 13 | 71 | 4.4 | 2.5 | 87 |
| 14 | 71 | 8.8 | 5.0 | 85 |
| 15 | 71 | 17.6 | 9.0 | 83 |
| 16 | 71 | 52.8 | 23 | 80 |
| 17 | 71 | 78.0 | 69 | 60 |

EXAMPLE 18

A triethoxysilylpropyl-endcapped polymer thought to have the structure:

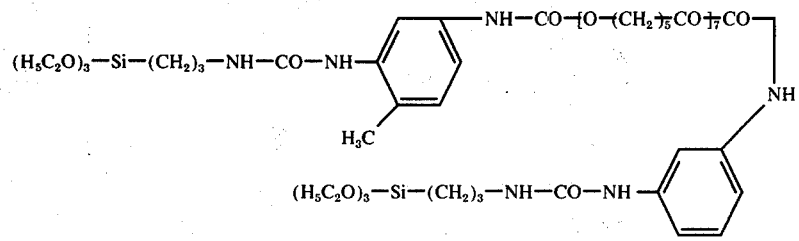

was prepared as described in Example 1 using a polycaprolactone having a molecular weight of 800 as the polyhydroxy compound. To the triethoxysilylpropyl-endcapped polymer was added 5% by weight of toluene diisocyanate-endcapped polyoxyethylenediol (MW = 1000) and various concentrations of β,β-bis(perfluoromethylsulfonyl)styrene. The effect on the storage stability and curing rates were determined. The results are shown in Table 3.

Table 3

| Catalyst Conc. | Skin Cure Time | Hardness (2 Hours) Shore A | Storage Stability Weeks |
|---|---|---|---|
| 0.12 % | 7–8 min. | 50 | > 12 wks./50° C |
| 1.25 % | 4–5 min. | 60 | > 12 wks./50° C |
| 0.5 % | 1–2 min. | 75 | > 12 wks./50° C |
| 1.4 % | 1–2 min. | 77 | > 12 wks./50° C |

EXAMPLES 19–33

To 230 g (0.23 equivalent) of "Carboxax-100" (polyoxyethylene glycol having an average molecular weight of 1000) which had been dried by azeotroping with benzene was added under nitrogen 41.7 g (0.24 moles) of toluene diisocyanate. The mixture was heated at 60°–80° C for 20 hours, after which the mixture was cooled to room temperature, 53 g (0.24 moles) of γ-aminopropyltrimethoxysilane was added and stirring continued for several hours to produce a trialkoxysilyl-endcapped vulcanizable polymer having a formula analogous to that produced in Example 1. There was then added 300 g methylene chloride and as a stabilizer against premature curing 30 g of diisocyanate-endcapped polyoxyalkylene polyol such as toluene diisocyanate-endcapped "Carbowax-600". "Carbowax-600" is a polyoxyethylene glycol having an average molecular weight of 600 available from Union Carbide Corporation.

To 20 g portions of the above stabilized solution of trialkoxysilyl-endcapped vulcanizable polymer was added 0.1 g of the fluoroaliphaticsulfonyl-substituted ethylene compound crosslinking agent listed in Table 4. The skin cure time of each portion is given in Table 4.

Table 4

| Example No. | Catalyst | Skin Cure Time (Minutes) |
|---|---|---|
| 19. | ⌬—CH=C(SO₂CF₃)₂ | 1-2 |
| 20. | ⌬—CH=C(SO₂C₄F₉)₂ | 2-3 |
| 21. | (H₃C)₂N—⌬—CH=C(SO₂CF₃)₂ | 50 |
| 22. | naphthyl—CH=C(SO₂CF₃)₂ | 1-2 |
| 23. | naphthyl—CH=C(SO₂C₈F₁₇)₂ | 14 |
| 24. | O₂N—⌬—CH=C(SO₂CF₃)₂ | 1-2 |
| 25. | 2,4,6-(CH₃)₃-⌬—CH=C(SO₂CF₃)₂ | 8 |
| 26. | ⌬—CH₂—CH=C(SO₂CF₃)₂ | 8 |
| 27. | (furyl-O)—CH=C(SO₂CF₃)₂ | — |
| 28. | (furyl-O)—CH=C(SO₂C₆F₁₃)₂ | — |
| 29. | (thienyl-S)—CH=C(SO₂CF₃)₂ | — |
| 30. | (pyrrolyl-NH)—CH=C(SO₂CF₃)₂ | 24 Hours |
| 31. | (N-CH₃ pyrrolyl)—CH=C(SO₂CF₃)₂ | — |

Table 4-continued

| Example No. | Catalyst | Skin Cure Time (Minutes) |
|---|---|---|
| 32. | 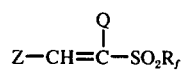 ⌬—CH=C(SO₂CF₃)(CO-⌬) | — |
| 33. | ⌬—CH=C(SO₂CF₃)(COCF₃) | — |

The data of Table 4 indicates that the skin cure time varies according to the nature of the aromatic group and the length of the fluoroaliphatic group of the cross-linking agent. Films cast from the solution and allowed to dry in air having a relatively humidity of at least 30% were tough, clear and essentially colorless. The films had a Shore A hardness of at least 50 and were insoluble in benzene.

What is claimed is:

1. A storage stable viscous resinous composition curable at room temperature on exposure to moisture, comprising:
   a. a vulcanizable polymer having at least one terminal trialkoxysilyl radical; and
   b. homogenously blended with said polymer a catalytic amount of a fluoroaliphaticsulfonyl substituted ethylene compound sufficient to cause crosslinking of said vulcanizable polymer to a cured product, wherein the fluoroaliphaticsulfonyl substituted ethylene compound has the formula $$Z-CH=\overset{\overset{Q}{\|}}{C}-SO_2R_f$$

wherein $R_f$ is a monovalent saturated fluoroaliphatic radical; Q is a monovalent, non-ionic, electron withdrawing radical at least as electron withdrawing as a benzoyl radical; and Z is an aromatic group or an unsaturated, conjugated heterocyclic organic radical and having a valence on a carbon atom.

2. The composition of claim 1 wherein said heterocyclic organic radical is selected from a group consisting of

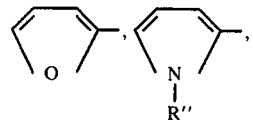

wherein R' is H or a lower alkyl

and wherein each member of said group may have one or more substituents selected from a group consisting of chlorine, bromine, fluorine atom, an alkyl, alkoxy, dialkylamino, or nitro radical.

3. The composition of claim 1 wherein the vulcanizable polymer has the formula $$R_1[O-CO-NH-R_2-NH-CO-X-R_3-Si(OR)_3]_n$$

wherein R is a monovalent lower alkyl radical having 1 to 6 carbon atoms, $R_1$ is a polyvalent radical which is the residue resulting from the removal of n hydroxyl groups from a polyoxy alkylene polyol having a molecular weight of from 300 to 6000, $n$ is the integer from 1 to 6, $R_2$ is a divalent alkylene radical having from 1 to 18 carbon atoms or a divalent aromatic radical having from 6 to 18 carbon atoms, X is a divalent bridging group selected from —O—, —S—, and —NR— wherein $R_4$ is hydrogen or a lower alkyl group having 1 to 6 carbon atoms, and $R_3$ is a divalent hydrocarbon radical or a divalent hydrocarbon ether radical having from 1 to 18 carbon atoms.

4. The composition of claim 1 wherein the vulcanizable polymer is a copolymer of a polymerizable organic vinylic compound with 0.01 to 100 moles per 100 moles of organic vinylic compound of a vinyl trialkoxysilyl monomer of the general formula $$\begin{array}{c} R_5-C=CH_2 \\ | \\ R_6-Si(OR)_3 \end{array}$$

wherein $R_5$ is hydrogen, methyl, or chlorine; $R_6$ is a divalent radical selected from the group consisting of

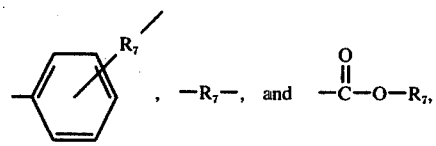

wherein $R_7$ is a lower alkylene group having 2–6 carbon atoms.

5. The composition of claim 1 wherein said fluoroaliphaticsulfonyl substituted ethylene compound has the formula $R_{11}$—CH=C(SO$_2$R$_f$)$_2$ wherein $R_{11}$ is a monovalent aryl radical having from 6–18 carbon atoms.

6. The composition of claim 1 additionally comprising 3 to 15% by weight of an organic polyisocyanate.

* * * * *